United States Patent
Shafer

(10) Patent No.: US 11,492,195 B2
(45) Date of Patent: Nov. 8, 2022

(54) DISPOSABLE SHEATH FOR OIL FILTER REMOVAL AND CONTAINMENT

(71) Applicant: Cap Shafer, Anchor Point, AK (US)

(72) Inventor: Cap Shafer, Anchor Point, AK (US)

(*) Notice: Subject to any disclaimer, the term of this patent is extended or adjusted under 35 U.S.C. 154(b) by 426 days.

(21) Appl. No.: 16/804,333

(22) Filed: Feb. 28, 2020

(65) Prior Publication Data

US 2021/0269235 A1  Sep. 2, 2021

(51) Int. Cl.
| | | |
|---|---|---|
| *B65F 1/00* | (2006.01) | |
| *B01D 29/31* | (2006.01) | |
| *B25B 27/00* | (2006.01) | |
| *B01D 35/31* | (2006.01) | |
| *F16N 31/00* | (2006.01) | |
| *F01M 11/03* | (2006.01) | |
| *B01D 35/00* | (2006.01) | |

(52) U.S. Cl.
CPC ............ *B65F 1/0006* (2013.01); *B01D 29/31* (2013.01); *B25B 27/0042* (2013.01); *B01D 35/005* (2013.01); *B01D 35/31* (2013.01); *B01D 2201/24* (2013.01); *B65F 2240/152* (2013.01); *F01M 11/03* (2013.01); *F16N 31/00* (2013.01)

(58) Field of Classification Search
None
See application file for complete search history.

(56) References Cited

U.S. PATENT DOCUMENTS

| | | | |
|---|---|---|---|
| 3,358,141 A | 12/1967 | Hoffmann et al. | |
| 3,385,141 A * | 5/1968 | Norman | B25B 27/0042 81/111 |
| 3,874,478 A * | 4/1975 | Mantell, Jr. | F01M 11/0408 251/144 |
| 4,020,922 A | 5/1977 | Klasel | |
| 4,177,529 A * | 12/1979 | Sikula, Jr. | B01D 27/00 141/330 |
| 4,230,002 A * | 10/1980 | Skidmore | B25B 27/0042 141/331 |
| 4,376,703 A * | 3/1983 | Krauss | B01D 35/31 220/737 |
| 4,450,964 A * | 5/1984 | Wood | G21F 3/00 976/DIG. 335 |
| 4,451,368 A * | 5/1984 | Pandelena | B01D 35/31 210/248 |
| 4,485,853 A * | 12/1984 | Gunderson | F01M 11/0408 141/97 |

(Continued)

FOREIGN PATENT DOCUMENTS

KR  1020180075078 A  7/2018

*Primary Examiner* — Robert J Popovics
(74) *Attorney, Agent, or Firm* — McKee, Voorhees & Sease, PLC

(57) ABSTRACT

A disposable oil filter containment sheath is provided for use during oil changes for combustion engines. The sheath has a closed bottom, a cylindrical sidewall, and an open top. The resilient sheath is rolled to an initial collapsed position for placement on the bottom of an oil filter mounted on the engine, and it is partially unrolled along the filter. The filter can then be loosened to allow oil to drain into the sheath for capturing a reservoir. After the filter is removed from the engine, the sheath is completely unrolled and tied at the top so as to fully enclose and contain the oil filter and oil. The sheath and its contents are then ready for disposal.

11 Claims, 2 Drawing Sheets

(56) References Cited

U.S. PATENT DOCUMENTS

| | | | | |
|---|---|---|---|---|
| 4,763,620 A * | 8/1988 | Zastocki | B01D 35/31 | 123/198 R |
| 4,865,727 A * | 9/1989 | Krauss | B01D 35/30 | 210/DIG. 17 |
| 4,867,017 A * | 9/1989 | Holman | B25B 27/0042 | 81/120 |
| 4,877,155 A * | 10/1989 | Tull | B67D 7/04 | 141/332 |
| 4,882,051 A * | 11/1989 | Itoh | B01D 35/30 | 210/441 |
| 4,913,813 A * | 4/1990 | Covarrubias | F16N 31/00 | 210/232 |
| 4,917,113 A * | 4/1990 | Conway | A61F 6/04 | 128/844 |
| RE33,206 E * | 5/1990 | Conway | A61F 5/453 | 604/349 |
| 4,929,356 A * | 5/1990 | Todd | B01D 27/106 | 210/248 |
| 4,934,382 A * | 6/1990 | Barone, Jr. | A61F 6/04 | 604/349 |
| 5,121,776 A * | 6/1992 | Kovach | F01M 11/0408 | 383/41 |
| 5,139,658 A * | 8/1992 | Hodge | B01D 27/08 | 210/DIG. 17 |
| 5,169,541 A * | 12/1992 | Wells | B01D 35/31 | 210/232 |
| 5,176,666 A * | 1/1993 | Conway | B29C 41/22 | 604/347 |
| 5,271,299 A | 12/1993 | Wadsworth | | |
| 5,316,386 A * | 5/1994 | Moore | F16N 31/002 | 383/3 |
| 5,334,175 A * | 8/1994 | Conway | A61F 5/453 | 604/347 |
| 5,366,084 A * | 11/1994 | Post | B01D 35/31 | 206/319 |
| 5,366,400 A * | 11/1994 | Kucik | B63J 4/00 | 210/DIG. 17 |
| 5,386,748 A * | 2/1995 | Kilgore | B25B 27/0042 | 81/180.1 |
| 5,421,223 A * | 6/1995 | Wawrzyniak | B25B 27/0042 | 81/3.4 |
| 5,425,401 A * | 6/1995 | Boggs | B01D 41/04 | 220/571 |
| 5,431,588 A * | 7/1995 | Kucik | F01M 11/0408 | 210/DIG. 17 |
| 5,432,954 A | 7/1995 | Taylor | | |
| 5,454,960 A * | 10/1995 | Newsom | B65D 19/44 | 141/86 |
| 5,469,935 A | 11/1995 | Hewuse | | |
| 5,482,093 A * | 1/1996 | Tremonti | F16N 31/002 | 141/311 A |
| 5,549,120 A * | 8/1996 | Persson | A61F 6/00 | 128/842 |
| 5,623,755 A | 4/1997 | Childress et al. | | |
| 5,655,624 A * | 8/1997 | Kelly, Jr. | F16N 31/002 | 184/1.5 |
| 5,667,699 A * | 9/1997 | Schlise | B01D 27/106 | 210/DIG. 17 |
| 5,694,990 A * | 12/1997 | Crima | F01M 11/0408 | 141/330 |
| 5,706,873 A * | 1/1998 | Benoit | F16N 33/00 | 141/331 |
| 5,722,508 A * | 3/1998 | Kraus | F01M 11/04 | 141/98 |
| 5,782,276 A * | 7/1998 | Kilgore | F16N 31/002 | 141/330 |
| 5,785,850 A * | 7/1998 | Lynch | B01D 29/15 | 210/DIG. 17 |
| 5,857,503 A * | 1/1999 | Vreeken | F16N 31/002 | 141/343 |
| 5,924,342 A * | 7/1999 | Chou | B25B 27/0042 | 81/3.4 |
| 5,944,034 A * | 8/1999 | McRae | B08B 7/0071 | 134/25.4 |
| 6,033,578 A * | 3/2000 | Loewen | B01D 35/31 | 210/DIG. 17 |
| 6,056,874 A | 5/2000 | Soodman | | |
| 6,227,078 B1 | 5/2001 | Lemmo, Jr. | | |
| 6,248,237 B1 * | 6/2001 | Mery | B01D 46/0098 | 55/357 |
| 6,325,247 B1 * | 12/2001 | Iggulden | B65D 41/62 | 428/40.1 |
| 6,401,574 B1 * | 6/2002 | Myers | B25B 27/0042 | 7/100 |
| 6,616,838 B1 * | 9/2003 | Harris | B01D 35/31 | 210/DIG. 17 |
| 6,769,516 B2 * | 8/2004 | Carlson | F16N 31/002 | 141/331 |
| 7,107,878 B1 * | 9/2006 | Jerantowski | B25B 27/0042 | 81/3.4 |
| 7,147,013 B2 * | 12/2006 | Zulauf | B01D 35/31 | 141/97 |
| 7,156,067 B1 * | 1/2007 | Gottschalk | B25B 27/0042 | 123/196 R |
| 7,241,385 B1 * | 7/2007 | Cline | B01D 35/30 | 210/232 |
| 7,340,979 B2 | 3/2008 | Sawyer | | |
| 7,662,285 B2 * | 2/2010 | Bilski | B01D 35/31 | 210/DIG. 17 |
| 8,578,975 B2 * | 11/2013 | Ernst | B67D 7/3209 | 141/330 |
| D697,539 S * | 1/2014 | Ernst | F01M 11/03 | D15/150 |
| 9,003,929 B2 * | 4/2015 | Laurel | B25B 27/0042 | 81/124.2 |
| 9,291,306 B2 * | 3/2016 | Conlan | F16M 13/02 | |
| 9,616,362 B2 * | 4/2017 | Johnson | B01D 35/30 | |
| 9,675,914 B2 * | 6/2017 | Rivera | B01D 29/96 | |
| 10,040,010 B1 * | 8/2018 | Mauroza | B01D 35/31 | |
| 10,065,298 B1 * | 9/2018 | Winscott | B25B 27/0042 | |
| 10,350,738 B2 * | 7/2019 | Sapp | B25B 27/0042 | |
| 10,518,394 B2 * | 12/2019 | Quick | B01D 29/96 | |
| 10,527,229 B2 * | 1/2020 | Hiebert | F01M 11/04 | |
| 10,711,545 B2 * | 7/2020 | Babri | E21B 21/066 | |
| D912,713 S * | 3/2021 | Moran | D15/150 | |
| D912,714 S * | 3/2021 | Moran | D15/150 | |
| 11,098,621 B2 * | 8/2021 | Tilbury | F01M 11/0408 | |
| 11,110,397 B2 * | 9/2021 | Whitaker | C02F 1/283 | |
| 11,154,968 B2 * | 10/2021 | Moran | B25B 13/5008 | |
| 11,311,992 B2 * | 4/2022 | Owens | B25B 27/0042 | |
| 11,383,363 B2 * | 7/2022 | Niles | B25B 27/0042 | |
| 2003/0062221 A1 | 4/2003 | Burrow et al. | | |
| 2004/0055827 A1 * | 3/2004 | Carlson | F16N 31/002 | 184/106 |
| 2004/0226878 A1 | 11/2004 | Higgins | | |
| 2005/0067343 A1 * | 3/2005 | Zulauf | B01D 35/31 | 210/443 |
| 2005/0076917 A1 * | 4/2005 | Wray | A61F 6/04 | 428/407 |
| 2006/0004332 A1 * | 1/2006 | Marx | A61F 5/453 | 604/347 |
| 2006/0053983 A1 * | 3/2006 | Groetsch | B25B 27/0042 | 81/121.1 |
| 2008/0234642 A1 * | 9/2008 | Patterson | A61F 5/441 | 604/347 |
| 2008/0276763 A1 | 11/2008 | Greenberg | | |
| 2009/0101597 A1 * | 4/2009 | Bilski | B01D 35/31 | 210/248 |
| 2009/0218273 A1 * | 9/2009 | Pummill | B01D 35/31 | 210/248 |
| 2010/0108191 A1 * | 5/2010 | Ernst | F01M 11/03 | 141/331 |
| 2012/0198970 A1 * | 8/2012 | Robidoux | B01D 35/31 | 81/121.1 |
| 2013/0161223 A1 * | 6/2013 | Tessier | F16N 31/00 | 206/525 |
| 2013/0206244 A1 * | 8/2013 | Laurel | B25B 27/0042 | 137/15.01 |
| 2014/0310937 A1 | 10/2014 | Kioko | | |

(56) References Cited

U.S. PATENT DOCUMENTS

| | | | |
|---|---|---|---|
| 2015/0122822 A1* | 5/2015 | Saffelle | F16N 31/002 220/573 |
| 2015/0323131 A1* | 11/2015 | Conlan | F16M 13/02 248/215 |
| 2016/0303719 A1* | 10/2016 | Klamm | B25B 27/0042 |
| 2016/0325417 A1* | 11/2016 | Klamm | B25B 13/28 |
| 2017/0049608 A1* | 2/2017 | Chiaokun | A61F 6/04 |
| 2017/0165820 A1* | 6/2017 | Leo | B01D 35/31 |
| 2018/0050284 A1* | 2/2018 | Mahdjoubi Namin | C02F 1/28 |
| 2018/0094771 A1 | 4/2018 | Hiebert | |
| 2019/0210202 A1 | 7/2019 | Quick et al. | |
| 2021/0244142 A1* | 8/2021 | Arrouart | A45C 13/1038 |
| 2021/0269235 A1* | 9/2021 | Shafer | B01D 29/31 |
| 2021/0364110 A1* | 11/2021 | Burns | F16L 29/007 |
| 2022/0074326 A1* | 3/2022 | Stenersen | F01M 11/0408 |

\* cited by examiner

DISPOSABLE SHEATH FOR OIL FILTER REMOVAL AND CONTAINMENT

FIELD OF THE INVENTION

The invention relates to a device for use in removing and disposing of oil filters, and particularly a disposable containment sheath which rolls onto and encases the oil filter.

BACKGROUND OF THE INVENTION

Combustion engines normally use oil as a cooling and lubricating medium. The oil has a limited life and must be replaced periodically with fresh oil. An oil filter on the engine helps extend the life of the oil, but also should be replaced when the oil is changed. Often, a tool must be used to loosen the filter. Once the oil seal is broken, oil leakage and dripping are common. Some oil filters are located in a position where it is difficult to place a catch pan. The oil also tends to drip onto other vehicle components adjacent the oil filter. Leaking and spilled oil is messy, difficult to clean up, and presents health and safety concerns to the person changing the oil, particularly when the oil is hot. Clean up of spilled oil also requires consumable products, which also must then be disposed. Thus, the oil changing process entails personal and environmental safety issues.

Commercial products are available to assist in removal of the oil filter. Some such products include reservoirs or channels for capturing the used oil. Since filters are vehicle specific, and come in many different sizes and shapes, the removal tools are often designed to fit one specific filter size, and are intended to be reusable tools, rather than disposable products. These tools also do not fully capture and contain the leaking oil during removal of the filter.

Therefore, there is a need for an improved device and method for containing an oil filter and used oil during an oil change for an internal combustion engine.

Accordingly, a primary objective of the present invention is the provision of a disposable sheath to assist in removing an oil filter, collecting used oil, and encasing the oil filter and used oil after the filter is removed from the engine.

A further objective of the present invention is the provision of a rollable sheath that grips an oil filter, contains dripping oil, and can be closed around the removed filter.

Still another objective of the present invention is a provision of a resilient sheath which eliminates or minimizes cleanup requirements after an oil change for an internal combustion engine.

Yet another objective of the present invention is a provision of a stretchable sheath which facilitates removal of an oil filter from an engine, captures oil leaking or dripping from the filter and/or engine, and is closed around the filter after the filter is removed.

A further objective of the present invention is a provision of a disposable oil filter containment sheath which is economical to manufacture, and durable and safe in use.

These and other objectives will become apparent from the following description of the invention.

SUMMARY OF THE INVENTION

The oil filter sheath of the present invention is made of a resilient, stretchable material so that the sheath can be in an initial rolled down configuration, and then is partially rolled up on the oil filter. The sheath has a body with a closed bottom, a cylindrical sidewall, and an open top. The sheath includes a lower reservoir, with channels in the sidewall to direct leaking or dripping oil to the reservoir. After the filter is removed from the engine, the sidewall of the sheath is further rolled upwardly so to enclose the filter. The top of the sheath can be tied to enclose the filter and collected oil for easy disposal.

In use, the oil filter is cracked loose, and then the resilient container is stretched over the bottom of the filter. The sheath is then unrolled toward the top of the filter, which can then be further loosened to allow oil to drain into the sheath and into the sheath reservoir. After the oil has stopped dripping from the filter, the filter can be fully removed from the engine, and then the sheath is further unrolled beyond the top of the oil filter and closed to encase the oil filter and captured oil. Then, the sheath and its contents can be disposed of in an environmentally safe manner.

DETAILED DESCRIPTION OF THE PREFERRED EMBODIMENTS

Figure 1:
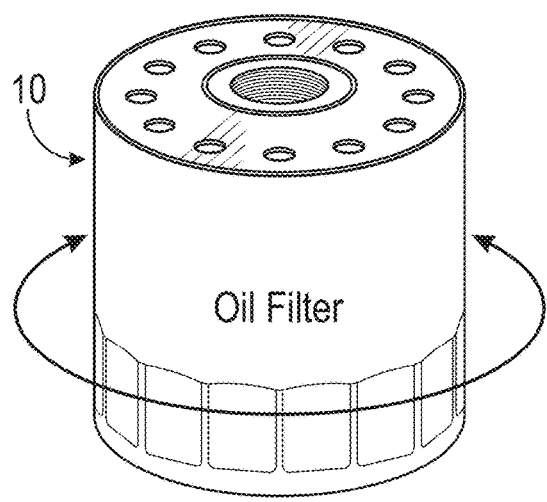
FIG. 1 shows an embodiment of a conventional oil filter for an internal combustion engine.

An oil filter is designated in the drawings by the reference numeral 10. The oil filter 10 is conventional and can take shapes other than that shown in FIG. 1 and can have various sizes.

Figure 6:
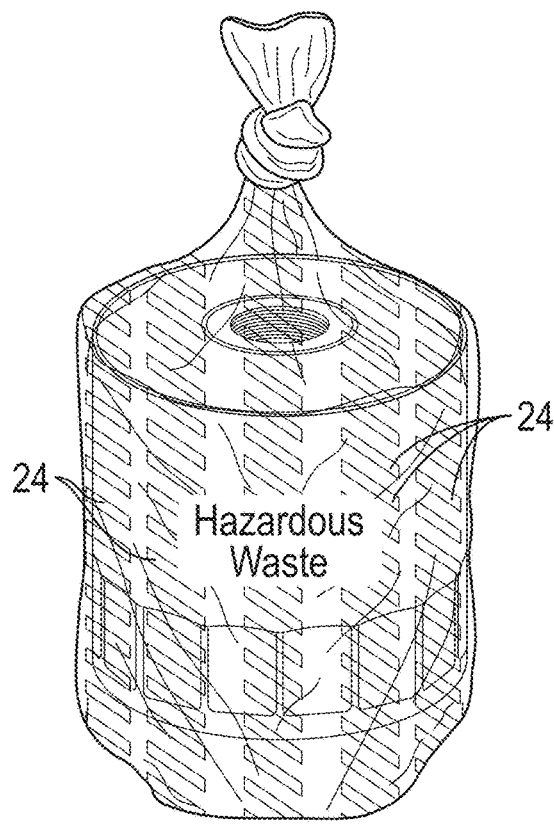
FIG. 6 shows the sheath fully unrolled and tied shut to enclose the filter.
Figure 7:
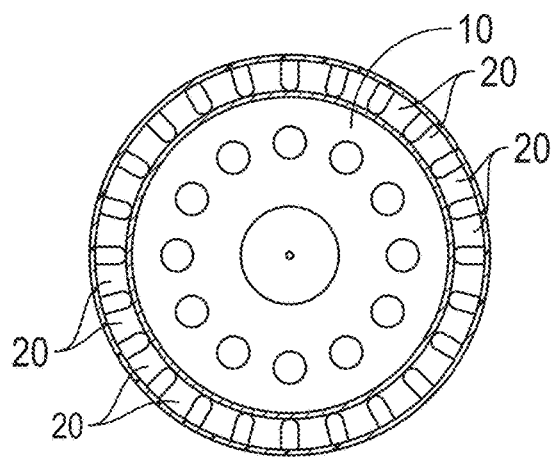
FIG. 7 is a sectional view taken long lines 7-7 of FIG. 3.

A container or sheath 12 is provided for removal and disposal of the used oil filter 10. The sheath 12 is formed as an integral one-piece body, and includes a closed bottom 14, a cylindrical sidewall 16, and an open top 18. The sheath 12 is made of a resilient or stretchable material so that the sidewall 16 can be rolled down and unrolled up. The sidewall 16 of the sheath 12 includes internal channels 20 which allow used oil to drain towards a reservoir 22 in the bottom 14 of the sheath. The exterior of the sidewall 16 may be smooth or textured, or have ribs, nubs or other protrusions 24 to enhance the grip of the sheath 12 by a person during removal of the oil filter 10 from an engine. The channels 20 generally extend longitudinally downwardly to the reservoir 22, while the protrusions 24 may have various patterns or directions or shapes to improve the grip of the sheath 12 on the filter 10. In one embodiment, the sidewall 16 of the sheath 12 is corrugated so as to form the internal channels 20 and the external gripping ribs 24. The unrolled sheath 12 has a height greater than the height of the oil filter 10, as seen in FIG. 6.

Figure 5:
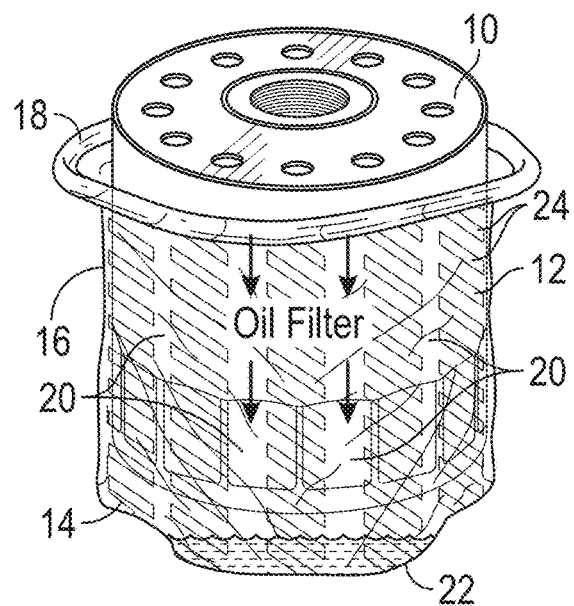
FIG. 5 is a view similar to FIG. 3 showing oil draining downwardly along the sheath channels to the lower sheath reservoir.

The upper end of the sidewall 16, adjacent the open top 18, may extend radially outwardly so as to form an enlarged diameter flange or collar adjacent the top of the filter 10, as shown in FIG. 5, to facilitate the capture of leaking or dripping oil when the filter 10 is loosened.

Figure 2:
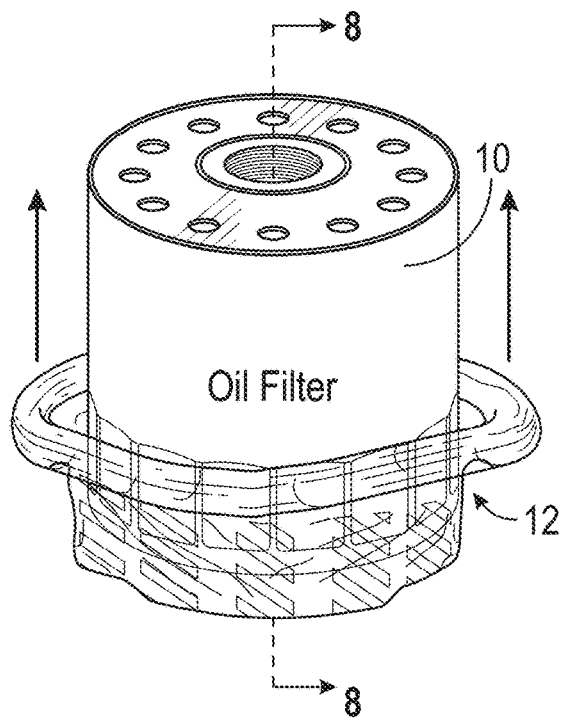
FIG. 2 shows the sheath of the present invention in a position on the bottom of the oil filter.
Figure 3:
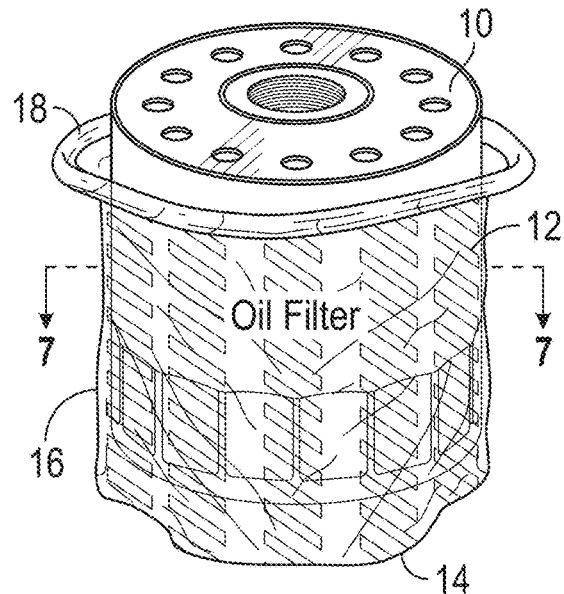
FIG. 3 shows the sheath rolled upwardly along the oil filter.
Figure 4:
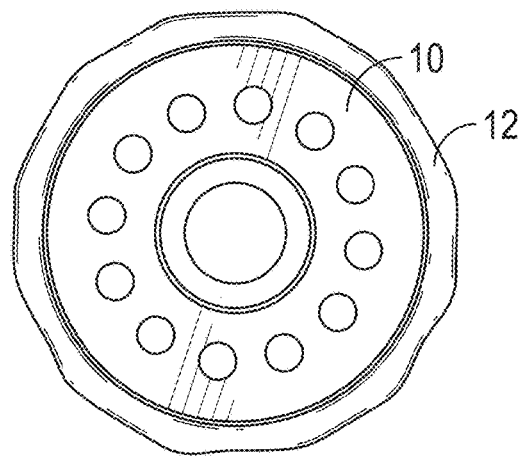
FIG. 4 is a top plain view of the sheath and oil filter shown in FIG. 3.
Figure 8:
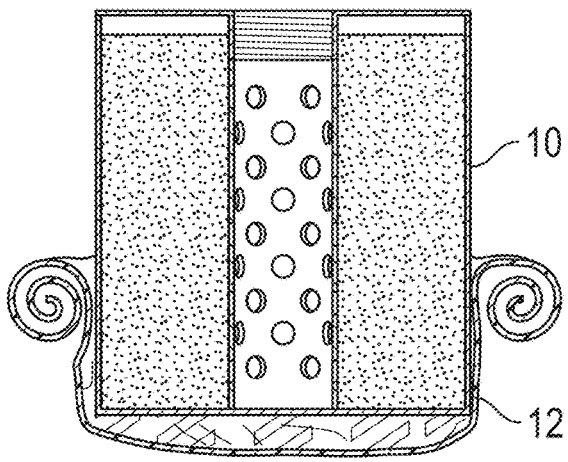
FIG. 8 is a sectional view taken along lines 8-8 of FIG. 2.

To start the oil change process, the filter 10 is cracked loose in any convenient manner, from its normal operating installation on the engine. Preferably, the filter 10 is loosened before the sheath 10 is installed on the filter. The sheath 12 is initially in a rolled configuration, as shown in FIGS. 2 and 8, such that the sidewall 16 can be stretched around the bottom of the filter 10. The sidewall 16 is then rolled upwardly along the filter 10 to a position adjacent the top of the filter 10, as shown in FIGS. 3 and 5. The filter 10 can then be further loosened to allow oil to drain into the sheath 12 and funnel downwardly along the channels 20 into the reservoir 22. When the oil stops dripping from the filter 10 and the engine, the filter can be completely removed from the engine. Then, the sidewall 16 of the sheath 12 can be unrolled further, beyond the top of the oil filter, as shown in FIG. 6. Then the top of the sheath 10 can be knotted or tied using any convenient mechanism, such as a zip tie, string, or twine so as to close the sheath 12 and enclose or encase the filter 10. Preferably, the oil filter 10 inside the sheath 12 is maintained in an upright orientation until the sheath is closed. The sheath 12 and its contents can then be disposed in an environmentally acceptable manner.

Thus, the sheath 12 creates a container for the used filter and oil. The sheath material is flexible and stretchable, yet tough, tear resistant, and compatible with petroleum products, and functional over a wide range of temperatures. The sheath or container 12 eliminates messy oil spills and provides a safe transport of the oil filter and used oil to a disposal location.

The resiliency and stretch ability of the sheath material allows the sheath 12 to fit various different filters within a range of sizes. The sheath 12 can be used in a shop environment, or alternatively, in the field or at the job site. The containment sheath makes maintenance and repairs easier, quicker, safer, and more environmentally sound.

It is understood that the sheath can be used on other types of filters, such as a fuel filter, which require periodic changing.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of removing an oil filter threadably attached to an engine, comprising the steps of:

providing a sheath having an open top end, a closed bottom end, and a cylindrical sidewall with flow channels extending between the open top end and the closed bottom end, the sheath being made of a resilient, stretchable material, the cylindrical sidewall of the sheath initially being in a rolled configuration;

cracking the oil filter loose from the engine by applying an unscrewing force;

stretching the open top of the sheath over a bottom of the oil filter;

partially unrolling the rolled sidewall of the sheath toward a top of the oil filter;

further unscrewing the oil filter without detaching the oil filter from the engine;

allowing oil to drain into the sheath through the flow channels to a reservoir;

removing the oil filter from the engine after oil has ceased dripping or flowing from the oil filter; and unrolling the remaining rolled sidewall to a position beyond the top of the removed oil filter.

2. The method of claim 1 further comprising disposing of the oil filter and surrounding sheath.

3. The method of claim 1 further comprising tying the unrolled sidewall above the oil filter to enclose the oil filter within the sheath.

4. The method of claim 3 further comprising maintaining the oil filter in an upright orientation to keep oil within the oil filter until the open end of the sheath is tied.

5. The method of claim 3 further comprising disposing of the oil filter enclosed within the sheath.

6. The method of claim 1 wherein the cracking step is accomplished with a tool.

7. The method of claim 1 further comprising allowing oil to funnel toward the reservoir before the oil filter is removed from the engine.

8. The method of claim 7 wherein the upper end of the cylindrical sidewall adjacent the open top end extends radially outwardly forming an enlarged diameter flange or collar for positioning adjacent the top of the oil filter to facilitate the funneling of oil toward the reservoir before the oil filter is removed from the engine.

9. The method of claim 1 wherein the exterior surface of the cylindrical sidewall is textured to facilitate gripping.

10. The method of claim 1 wherein the exterior surface of the cylindrical sidewall has ribs to facilitate gripping.

11. The method of claim 1 wherein the exterior surface of the cylindrical sidewall has protrusions to facilitate gripping.

* * * * *